2,791,609

TETRACYCLINE METALLO-PHOSPHATE COMPLEXES AND METHOD PREPARATION

Murray A. Kaplan, Syracuse, N. Y.

No Drawing. Application September 27, 1956,
Serial No. 612,366

3 Claims. (Cl. 260—559)

This invention relates to a new, therapeutically useful antibiotic compound and, more particularly, to tetracycline sodium hexametaphosphate complex.

It is the object of the present invention to provide a compound of tetracycline having improved therapeutic utility by comparison with the amphoteric tetracycline and the tetracycline hydrochloride which are now in clinical use; to provide such improvement it is necessary to increase the height or rate of attainment or duration of blood levels of tetracycline obtained in man or animals particularly upon oral administration of the tetracycline compound or salt.

The object of the present invention has been achieved and there is now provided by the present invention a tetracycline sodium hexametaphosphate compound.

More specifically, there is provided tetracycline sodium hexametaphosphate complex containing on an anhydrous basis the elements carbon, hydrogen, nitrogen, oxygen, sodium and phosphorus in a ratio substantially in accord with the empirical formula $5C_{22}H_{24}N_2O_8 \cdot NaPO_3 \cdot 5HPO_3$, which may also be described as therapeutically active, stable, non-toxic tetracycline sodium hexametaphosphate complex characterized in purified form on an anhydrous basis by the presence of 0.7 to 1.1% sodium, 5.8 to 7.8% phosphorus, a potency in the range of 760 to 940 micrograms of tetracycline hydrochloride equivalents per milligram by bio-assay, and a solubility in water at room temperature of about 3.2 mgm./ml. and further characterized by the production at the end of one and four hours after oral administration to man of a concentration in the blood stream substantially greater than that produced by the administration of an aquivalent amount of tetracycline hydrochloride.

The new tetracycline complex is preferably prepared by mixing aqueous, acid solutions of tetracycline, e. g. tetracycline hydrochloride, and sodium hexametaphosphate and collecting by filtration under acid conditions the precipitated crystalline salt. The ratios by weight of tetracycline hydrochloride to sodium hexametaphosphate to be used can vary widely; ratios of 1:2 to 1:0.05 are effective and about 1:0.25 or 1:0.33 is preferred. The acidity must be sufficient to maintain the tetracycline reagent in solution, e. g. less than about pH 2.0. The insolubility of the product makes the concentration used of little importance; reasonably concentrated solutions are, of course, more practical.

Tetracycline sodium hexametaphosphate complex gives higher blood levels in dogs and in man upon oral administration in capsules than do the forms of tetracycline now in use, is non-toxic and is stable in the dry state.

The tetracycline sodium hexametaphosphate complex is very stable and can be used for oral application in powdered form, as tablets or in capsules, but may also be used in suspensions in aqueous liquids or in anhydrous, edible oils, such as peanut oil, sesame oil or a modified coconut oil with a setting point below 60° F.

When desired for specific purposes and rendered pharmaceutically compatible, there may be admixed with a complex of the present invention various other additional medicaments, such as antihistamines, sulfa drugs, (e .g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N' - 3,4 - dimethylbenzoylsulfanilamide, benzylsulfanilamide and N'-2-(2-quinoxalyl)sulfanilamide), lipotropic agents (particularly methionine, choline, inositol and beta-sitosterol and mixtures thereof), stimulants of the central nervous system (e. g. caffeine, amphetamines), local anesthetics, analgesics (e. g. aspirin, salicylamide, sodium gentisate, p-acetylaminophenol, phenacetin, codeine), laxatives (e. g. phenolphthalein), sedatives (e. g. barbiturates, bromides), salts of penicillin (e. g. potassium penicillin G, procaine penicillin G, 1-ephenamine penicillin G, dibenzylamine penicillin G, other salts disclosed by U. S. Patent 2,627,491; these combinations are particularly useful to enable variation of the pattern of blood levels obtained), phenoxymethylpenicillin and salts thereof, other antibiotic agents (e. g. streptomycin, dihydrostreptomycin, bacitracin, polymixin, tyrothricin, erythromycin, Aureomycin, Terramycin, oleandomycin, chloramphenicol, magnamycin, novobiocin, cycloserine; in some cases such combinations attack a wider range of organisms or show synergistic efficacy or provide decreased toxicity with equal efficacy), vitamins (e. g. Vitamins A, $A_1$, $B_1$, $B_2$, $B_6$, $B_{12}$ and members of that family, folic acid and members of that family, Vitamins C, $D_2$, $D_3$ and E), hormones (e. g. cortisone, hydrocortisone, 9α-fluorocortisone, 9α-fluorohydrocortisone, prednisone and prednisolone), anabolic agents (e. g. 11,17-dihydroxy - 9α - fluoro - 17α-methyl-4-androsten-3-one; 17-α-ethyl-19-nortestosterone) and antifungal agents (e. g., mycostatin).

Analyses expressed herein as mcg./ml. or mcg./mgm. refer according to the usual custom to micrograms of tetracycline hydrochloride equivalents. Thus, pure tetracycline hydrochloride has a potency of 1000 mcg./mgm. and pure tetracycline base of 1080 mcg./mgm., etc.

While the preferred embodiment of this invention is tetracycline sodium hexametaphosphate complex, a useful complex is also prepared by substituting potassium for the sodium of the preferred complex.

Average analytical values for nine to twelve separate preparations of tetracycline sodium hexametaphosphate complex was found to be as follows:

Moisture by vacuum-oven technique. 9.7% (range 6.6–15.2%).

Moisture by Karl Fischer__. 10.9% (range 8.4–16.7%).

Other values as corrected for moisture by Karl Fischer:

Phosphorus _____ 6.8% (range 5.5–7.8%).
Sodium _____ 1.0% (range 0.8–1.1%).
Potency in mcg./mgm. by bio-assay. 843 (range 760–940).
Potency in mcg./mgm. by ultra-violet absorption: Assay. 843 (range 800–893).

In the preparation of these samples, the ratio of the weights of tetracycline hydrochloride to sodium hexametaphosphate used as reagents varied from 1:2 to 1:0.1 and was 1:0.33 in about half the cases. The difference between the moisture content as determined by the vacuum-oven and Karl Fischer techniques indicates the presence of water of crystallization, probably one molecule per atom of sodium.

These results indicate that anhydrous tetracycline sodium hexametaphosphate complex has the empirical, and probably the molecular, formula $$5C_{22}H_{24}N_2O_8 \cdot NaPO_3 \cdot 5HPO_3$$

for which the theoretical values are 0.85% sodium, 6.8% phosphorus and 880 mcg./mgm. potency, but this is purely a matter of theory and is not essential to the present invention nor is the present invention restricted thereto. This empirical expression is so written for convenience and ease of comprehension and is particularly not intended to imply the existence in this product of any $PO_3$ ions, as the product is a complex hexametaphosphate.

A more comprehensive understanding of this invention is obtained by reference to the following examples, which are illustrative only and are not the exclusive embodiment of the invention.

EXAMPLE 1

Five gram lots of tetracycline hydrochloride in aqueous solution at 50 mgm./ml. were mixed with aqueous solutions of sodium hexametaphosphate adjusted to pH 1.5 with hydrochloric acid and containing 2.5 g., 1.66 g., 1.25 g. and 0.50 g. respectively of sodium hexametaphosphate. An immediate precipitate of tetracycline sodium hexametaphosphate complex precipitated and was collected by filtration, washed with methanol and dried over phosphorus pentoxide with these results:

| Weight Ratios of Sodium Hexametaphosphate to Tetracycline Hydrochloride | Yield in grams | Bio-assay, mcg./mgm. |
|---|---|---|
| 1:2 | 0.5 | |
| 1:3 | 2.4 | 630 |
| 1:4 | 0.5 | |
| 1:10 | 0.9 | 730 |

This product gave blood levels in dogs of 1.29 and 1.80 mcg./ml. respectively one and four hours after oral administration of a single dose of 12.5 mgm. tetracycline hydrochloride equivalents/kg. Under the same conditions, tetracycline hydrochloride levels are 0.77–0.92 mcg./ml. after one hour and 0.75–0.76 mcg./ml. after four hours.

This product had a solubility in water of about 3.2 mgm./ml. at room temperature.

EXAMPLE 2

Eighty grams of sodium hexametaphosphate (Calgon) was dissolved in about 1600 ml. water and the pH was adjusted to 1.5 with hydrochloric acid; this solution was then added with stirring to a solution of 240 g. tetracycline hydrochloride in 2.4 liters water (100 mgm./ml.). After some tetracycline sodium hexametaphosphate complex formed as a gum, the solution was decanted and seeded to produce crystalline tetracyline sodium hexametaphosphate complex (178 g.) after stirring two hours, collecting by filtration and washing thoroughly with water and then methanol. An additional 21 g. crystalline product was obtained from the gum by stirring it in water with seed crystals. The product gave the following analyses after correction for the presence of 8.4% water (Karl Fischer): Tetracycline hydrochloride equivalents in mcg./mgm.: 763 (bio-assay); 815 (ultraviolet assay); sodium, 1.0%; phosphorus, 6.1%. The presence of one, or perhaps two, molecules of water of hydration was indicated by the value of 7.3% moisture found by the vacuum oven technique.

Theory for [5 tetracycline·$NaPO_3$·$5HPO_3$] is potency 880, 0.85% sodium and 6.8% phosphorus.

The complex gave blood levels in dogs of 1.87 and 1.08 mcg./ml. respectively one and four hours after oral administration of a single dose of 12.5 mgm. tetracycline hydrochloride equivalents/kg.

EXAMPLE 3

In duplicate runs, a solution of 1200 g. tetracycline hydrochloride in 12 l. water, having pH 1.7, was added to a solution prepared by dissolving 400 g. sodium hexametaphosphate (Calgon) in 4 l. water, adjusting the pH to 1.7 with concentrated hydrochloric acid and filtering. The first half of the solution was added rapidly; the mixture then grew turbid and the second half of the solution was added slowly over 30 minutes with seeding and stirring. The yellow crystalline tetracycline sodium hexametaphosphate complex which precipitated was collected by filtration after stirring for three hours, washed with 1.5 l. water and then 1 l. methanol, dried 16 hours at 55° C. and found to weigh 1063 g. and 998 g. respectively. The two yields were combined and found to contain 10.7% moisture by Karl Fischer and, as corrected for moisture, 5.75% phosphorus and 1.1% sodium and to assay 803 and 860 mcgs. tetracycline hydrochloride equivalents/mgm. by bio-assay and ultraviolet absorption assay respectively.

This product gave blood levels in dogs of 1.74 and 1.30 mcg./ml. respectively one and four hours after oral administration of a single dose of 12.5 mgm. tetracycline hydrochloride equivalents/kg.

EXAMPLE 4

Five lots of tetracycline sodium hexametaphosphate complex were prepared by mixing aqueous solutions (adjusted to pH 1.5 with hydrochloric acid) of 25 g. tetracycline hydrochloride in 250 ml. water and sodium hexametaphosphate in the indicated amounts in 125 ml. water and collecting product having the following, tabulated properties:

| Weight of sodium hexametaphosphate in g. | Yield in g. | Moisture by Karl Fischer, percent | Product Potency [1] | | Na [1] in Percent | P [1] in Percent |
|---|---|---|---|---|---|---|
| | | | by bio-assay | by ultraviolet assay | | |
| 50 | 7 | 12.5 | 940 | 893 | 0.9 | 5.5 |
| 25 | 15.5 | 12.7 | 846 | 800 | | 7.7 |
| 12.5 | 17.5 | 10.3 | 894 | 836 | 0.9 | 7.8 |
| 8.33 | 17.5 | 10.9 | 840 | 838 | 0.8 | 7.7 |
| 2.5 | 7 | 10.7 | 880 | 853 | 0.8 | 7.0 |

[1] Corrected for moisture.

EXAMPLE 5

In dulicate runs 70 g. sodium hexametaphosphate (Victor) was dissolved in 1400 ml. water with the addition of a small amount of sodium hydroxide. The pH was then adjusted to 1.5 with concentrated hydrochloric acid. To this solution there was added a solution at 100 mgm./ml. of 210 g. tetracycline hydrochloride adjusted to pH 1.5. After stirring two hours, the precipitated, crystalline tetracycline sodium hexametaphosphate complex was collected by filtration, washed with pH 1.5 water and with methanol, air dried and found to have the following properties:

*Analyses (corrected for moisture)*

| Run No. | Yield in g. | Moisture in percent by Karl Fischer | Potency | | Na in percent | P in percent |
|---|---|---|---|---|---|---|
| | | | by bio-assay | by ultraviolet assay | | |
| 1 | 182 | 16.7 | 855 | 850 | 1.1 | 6.7 |
| 2 | 170 | 13.6 | 855 | 843 | 1.0 | 7.0 |

EXAMPLE 6

Five gram lots of tetracycline hydrochloride in aqueous solution at 50 mgm./ml. were mixed with aqueous solutions of sodium hexametaphosphate (Calgon) adjusted to pH 1.5 with hydrochloric acid and containing 2.5 g., 1.66 g., 1.25 g. and 0.50 g. respectively of sodium hexametaphosphate. An immediate precipitate of tetracycline sodium hexametaphosphate complex precipitated either as crystals or as a gum which gradually crystallized. The yields after methanol-washing and drying over $P_2O_5$ were 3.25 g., 3.25 g., (bio-assay 660 mcg./mgm.), 2.75 g. and 1.0 g. respectively. The product had a solubility in water of about 3.1 mgm./ml., gave blood levels in dogs of 2.59 and 1.54 mcg./ml. respectively one and four hours after oral administration of a single dose of 12.5 mgm. tetracycline hydrochloride equivalents/kg. and was found by analysis to contain 7.0% phosphorus and 2.60% moisture.

EXAMPLE 7

Capsules containing the tetracycline sodium hexametaphosphate complex of the present invention were prepared by mixing the salt with 5% magnesium stearate (200 mesh) and as much lactose as needed for the size of capsule to be used, screening the mixture and filling into hard gelatin capsules. The amount of complex in each capsule was that equivalent to 250 mgms. tetracycline hydrochloride, e. g. 340 mgms. for a sample of complex having a potency by bio-assay of 730 mcg./mgm.

The blood levels produced in man upon oral administration of a single capsule containing the equivalent of 250 mgms. of tetracycline hydrochloride were determined for the above capsules and for two brands of tetracycline hydrochloride capsules used as controls with the following results:

*Blood levels in man*

| Form of Tetracycline | Number of Patients | Mcgs. of Tetracycline per ml. of Plasma at the indicated number of hours after administration ||||||
|---|---|---|---|---|---|---|---|
| | | 1 hour | 2 hours | 3 hours | 4 hours | 8 hours | 24 hours |
| Brand of of tetracycline hydrochloride | 5-21 | 0.55 | 1.21 | 0.87 | ------ | 0.70 | 0.16 |
| Brand B of tetracycline hydrochloride | 10-22 | 0.41 | 0.92 | 0.99 | ------ | 0.63 | 0.20 |
| Tetracycline Sodium Hexametaphosphate Complex | 9 | 0.94 | ------ | ------ | 1.75 | 1.22 | 0.21 |

It is obvious by inspection that the tetracycline sodium hexametaphosphate complex gave much higher blood levels without loss of duration. An additional quantitative measure of this improvement is furnished in the usual way by plotting these blood levels and measuring (integrating) the areas under the curves. It is thus found that tetracycline sodium hexametaphosphate complex is absorbed nearly twice as efficiently as tetracycline hydrochloride.

EXAMPLE 8

Tablets containing the following ingredients:

| | G. |
|---|---|
| Tetracycline sodium hexametaphosphate complex (60 mesh) | 0.400 |
| Calcium phosphate monobasic anhydrous (60 mesh) | 0.025 |
| Calcium phosphate dibasic, anhydrous (60 mesh) | 0.025 |
| Lactose U. S. P., powdered (60 mesh) | 0.050 |
| Starch U. S. P. (60 mesh) | 0.057 |
| Magnesium stearate (200 mesh) | 0.003 | are prepared by mixing all of the ingredients with the exception of one-half of the magnesium stearate. The mixture is then slugged and granulated into 20 to 60 mesh granules. The remaining magnesium stearate is added to the granules, which are thoroughly mixed and finally tabletted.

EXAMPLE 9

Aqueous oral suspensions are prepared by using the following formulations:

| | A | B |
|---|---|---|
| Kelmar (potassium alginate) g | 3.75 | ------ |
| Sucrose (granulated) g | 400 | 647 |
| Methyl Paraben U. S. P. (200 mesh) g | 0.80 | 0.80 |
| Propyl Paraben U. S. P. (200 mesh) g | 0.20 | 0.20 |
| Cherry Flavor cc | 1.97 | ------ |
| Sodium Bisulfite, reagent g | 1.40 | ------ |
| Sodium Citrate U. S. P. g | 2.00 | ------ |
| Sodium Saccharin U. S. P. (200 mesh) g | 0.665 | ------ |
| Sodium Sucaryl (200 mesh) g | 16.66 | ------ |
| Tween 85 cc | ------ | 0.10 |
| Sodium Metabisulfite g | ------ | 1.00 |
| Gum Tragacanth g | ------ | 2.00 |
| Oil of Chocolate cc | ------ | 0.75 |
| Oil of Peppermint cc | ------ | 0.075 |
| Sodium Chloride g | ------ | 3.50 |
| Distilled Water, q. s. to cc | 1,000 | 1,000 |

To 500 cc. of distilled water the methyl paraben, propyl paraben, sodium bisulfite or sodium metabisulfite, sodium chloride, sodium citrate, sodium saccharin and sodium sucaryl are added and agitated until solution is obtained. The sucrose and Kelmar or the sucrose and gum tragacanth are dry mixed and slowly added to the solution with mixing. Then the Tween 85 and flavors are added under agitation and distilled water added until the total volume is about 950 cc. Finally 40 g. of tetracycline sodium hexametaphosphate complex (200 mesh) is added under agitation, the volume made up to 1000 cc. with distilled water and the product filled into bottles.

Tetracycline sodium hexametaphosphate complex is distinguished from other tetracycline phosphates in many ways. The most important is the failure of the others to give blood levels higher than those obtained with tetracycline hydrochloride; this has been found true in particular of the tetracycline ortho-phosphate postulated by Conover (U. S. Patent 2,699,054). Conover discloses only "salts" of "strong" mineral acids, including phosphoric acid. Such an ortho-phosphate does not include a metallic ion, i. e. is not a tetracycline sodium ortho-phosphate complex. Specific illustrations of these differences from other tetracycline phosphates are given in the "Comparison Examples" below.

COMPARISON EXAMPLE 1

Five gram lots of tetracycline hydrochloride in aqueous solution at 50 mgm./ml. were mixed with aqueous solutions containing 2.5 g., 1.66 g, 1.25 g., and 0.50 g. respectively of orthophosphoric acid (specific gravity 1.7; 85% acid). The products were adjusted to pH 1.5 if necessary. No solid precipitated either immediately or on standing.

COMPARISON EXAMPLE 2

Ten grams of tetracycline base was added slowly with stirring to a solution of 2.2 g. $H_3PO_4$ in propanol. The tetracycline orthophosphate which precipitated was collected, washed with propanol and then acetone, dried over $P_2O_5$, found to weigh 7.5 g. and to be soluble in water at room temperature to the extent of about 2.3 mgm./ml. and to give blood levels in dogs of 0.38 and 0.66 mcg./ml. respectively one and four hours after oral administration of a single dose of 12.5 mgm. tetracycline hydrochloride equivalents/kg.

COMPARISON EXAMPLE 3

Admixture of solutions adjusted to pH 1.5 of 30 g. tetracycline hydrochloride in 300 ml. water and either 13.6 g. in 136 ml. water or 10 g. in 100 ml. water of $NaH_2PO_4 \cdot H_2O$ gave no precipitate either immediately or on standing.

COMPARISON EXAMPLE 4

An aqueous solution was prepared containing 5 g. tetracycline and 1.66 g. sodium orthophosphate ($Na_3PO_4$) in water adjusted to pH 1.5 and a volume of 50 ml. No solid precipitated.

Replacement of the sodium orthophosphate with sodium hexametaphosphate (Calgon) in a duplicate experiment precipitated 3.15 g. tetracycline sodium hexametaphosphate complex, bio-assaying 620 mcg./mgm.

COMPARISON EXAMPLE 5

Five gram lots of tetracycline hydrochloride in aqueous solution at 50 mgm./ml. were mixed with aqueous solutions of sodium tetrametaphosphate adjusted to pH 1.5 and containing 2.5 g., 1.66 g., 1.25 g. and 0.50 g. respectively of sodium tetrametaphosphate. No solid precipitated either immediately or upon standing.

COMPARISON EXAMPLE 6

Five gram lots of tetracycline hydrochloride in aqueous solution at 50 mgm./ml. were mixed with aqueous solutions containing 2.5 g., 1.66 g., 1.25 g. and 0.50 g. respectively of potassium polymetaphosphate which had been adjusted to pH 1.5 with hydrochloric acid. No substantial amount of solid precipitated except in the case where 0.50 g. potassium polymetaphosphate was used. In that case, 1.2 g. of solid bio-assaying 790 mcg./mgm. was obtained. This solid was soluble in water to the extent of about 2.0 mgm./ml. at room temperature.

COMPARISON EXAMPLE 7

Five gram lots of tetracycline hydrochloride in aqueous solution at 50 mgm./ml. were mixed with aqueous solutions of sodium hypophosphite adjusted to pH 1.5 and containing 2.5 g., 1.66 g., 1.25 g. and 0.50 g. respectively of sodium hypophosphite. No solid precipitated either immediately or on standing.

COMPARISON EXAMPLE 8

Five gram lots of tetracycline hydrochloride in aqueous solution at 50 mgm./ml. were mixed with aqueous solutions of sodium tripolyphosphate adjusted to pH 1.5 with hydrochloric acid and containing 2.5 g. and 1.25 g. respectively of sodium tripolyphosphate. Solid precipitates formed in the amounts of 1.3 g. and 1.6 g. respectively and were combined, found to bio-assay 800 mcg./mgm., to be soluble in water at room temperature to the extent of about 0.26 mgm./ml. and to give blood levels in dogs of 0.78 and 0.51 mcg./ml. respectively one and four hours after oral administration of a single dose of 12.5 mgm. tetracycline hydrochloride equivalents/kg. Under the same conditions, tetracycline hydrochloride levels are 0.77–0.92 mcg./ml. after one hour and 0.75–0.76 mcg./ml. after four hours.

COMPARISON EXAMPLE 9

Five gram lots of tetracycline hydrochloride in aqueous solution at 50 mgm./ml. were mixed with aqueous solutions of sodium pyrophosphate ($Na_4P_2O_7$) adjusted to pH 1.5 and containing 2.5 g. and 1.25 g. respectively of sodium pyrophosphate. Solid precipitate formed in the amounts of 1.2 g. and 1.4 g. and were combined, found to bio-assay 740 mcg./mgm. and to be soluble in water at room temperature to the extent of about 0.34 mgm./ml. and to give blood levels in dogs of 0.04 and 0.56 mcg./ml., respectively one and four hours after oral administration of a single dose of 12.5 mgm. tetracycline hydrochloride equivalents/kg.

COMPARISON EXAMPLE 10

When a solution, adjusted to pH 1.5 of potassium metaphosphate is added to an aqueous solution of tetracycline hydrochloride at 50 mgm./ml., there is precipitated a solid, often gummy, which redissolves as additional amounts of metaphosphate are added. It was found that the use of 0.25 g. potassium metaphosphate per gram of tetracycline hydrochloride gave a gum which could be recrystallized from water and obtained as a yellow, crystalline solid, bio-assaying about 610 mcg./ml., giving blood levels in dogs of 0.72 and 0.45 mcg./ml. respectively one and four hours after oral administration of a single dose of 12.5 mgm. tetracycline hydrochloride equivalents/kg. and exhibiting a solubility in water at room temperature of about 5.1 mgm./ml.

COMPARISON EXAMPLE 11

One gram of pure ammonium epitetracycline was dissolved in 10 ml. of water and adjusted to pH 1.8 by the addition of hydrochloric acid. Sodium hexametaphosphate (Calgon) (330 mgm.) was dissovlved in 5 ml. water and adjusted to pH 1.8 with hydrochloric acid. Upon mixing the two solutions, no precipitate was obtained, even upon seeding with tetracycline sodium hexametaphosphate complex and standing for three days.

COMPARISON EXAMPLE 12

In a cross-over test in seven patients, the following blood levels were obtained by single oral doses of amounts in capsules equivalent to 250 mgms. tetracycline hydrochloride:

| Compound | Blood Levels in mcg./ml.— Hours after Administration | | | | |
|---|---|---|---|---|---|
| | 1 | 2 | 3 | 8 | 24 |
| Tetracycline Sodium Hexametaphosphate Complex. | 1.58 | 2.68 | 2.61 | 1.35 | 0.29 |
| Tetracycline Hydrochloride | 0.83 | 1.37 | 1.84 | 1.10 | 0.22 |

I claim:
1. Tetracycline metallo-hexametaphosphate complex wherein said metallo-hexametaphosphate is a member selected from the group consisting of soduim hexametaphosphate and potassium hexametaphosphate.
2. Tetracycline sodium hexametaphosphate complex.
3. The process of mixing an aqueous solution containing at least 3 mgm./ml. of tetracycline and an aqueous solution containing sodium hexametaphosphate in an amount, by weight, of from one-twentieth to twice the weight of tetracycline in said tetracycline solution to produce tetracycline sodium hexametaphosphate complex, each of said solutions having a pH below about 2.0

References Cited in the file of this patent

UNITED STATES PATENTS

| 2,658,078 | Blase | Nov. 3, 1953 |
| 2,699,054 | Conover | Jan. 11, 1955 |

FOREIGN PATENTS

| 714,085 | Great Britain | Aug. 25, 1954 |
| 1,085,274 | France | July 21, 1954 |
| 526 of 1955 | Union of South Africa | Oct. 19, 1955 |
| 7 of 1954 | Trinidad | Mar. 26, 1954 |

OTHER REFERENCES

Minieri et al.: "Antibiotics Annual," 1953–54, pages 82 and 83.